United States Patent [19]
Griess et al.

[11] Patent Number: 6,128,752
[45] Date of Patent: Oct. 3, 2000

[54] FAULT TOLERANT DESIGN FOR IDENTIFICATION OF AC DEFECTS INCLUDING VARIANCE OF CYCLE TIME TO MAINTAIN SYSTEM OPERATION

[75] Inventors: Kevin Roy Griess; Ann Caroline Merenda, both of Poughkeepsie; Donald Lloyd Pierce, Hyde Park, all of N.Y.

[73] Assignee: International Business Machines Corporation, Armonk, N.Y.

[21] Appl. No.: 08/338,976

[22] Filed: Nov. 14, 1994

Related U.S. Application Data

[63] Continuation of application No. 07/807,696, Dec. 16, 1991, abandoned.

[51] Int. Cl.$^7$ ................................................. G06F 11/14
[52] U.S. Cl. .................................................. 714/17; 714/49
[58] Field of Search .............................. 371/12, 61, 28; 395/575; 714/15, 16, 17, 49

[56] References Cited

U.S. PATENT DOCUMENTS

| | | | |
|---|---|---|---|
| 3,548,177 | 12/1970 | Hartlipp et al. . | |
| 3,868,647 | 2/1975 | Zandveld | 340/172.5 |
| 4,003,086 | 1/1977 | Larsen et al. | 360/53 |
| 4,025,768 | 5/1977 | Missios et al. . | |
| 4,044,337 | 8/1977 | Hicks et al. | 364/200 |
| 4,412,281 | 10/1983 | Works | 395/575 |
| 4,481,575 | 11/1984 | Bazlen et al. | 364/200 |
| 4,800,564 | 1/1989 | Defazio et al. | 371/61 |
| 4,912,707 | 3/1990 | Kogge et al. | 371/12 |

FOREIGN PATENT DOCUMENTS

| | | | |
|---|---|---|---|
| 403054638 | 3/1991 | Japan | G06F 11/14 |

OTHER PUBLICATIONS

IEEE Spectrum, Feb. 1984, pp. 36–42, "Maintenance processors for Mainframe Computers" by T. S. Liu.
IBM Technical Disclosure Bulletin, vol. 21, No. 4, Sep. 1978, "Retry with Performance Degradation".
IBM Technical Disclosure Bulletin, vol. 29, No. 2, Jul. 1986, pp. 903–904, "Clock Recovery . . . Counter".
IBM Technical Disclosure Bulletin, vol. 28, No. 1, Jun. 1985, pp. 49–51, "Self Test AC Isolation".
IBM Technical Disclosure Bulletin, vol. 27, No. 4B, Sep. 1984, pp. 2509–2510, "High Speed Programmable Clock Generator".

*Primary Examiner*—Robert W. Beausoliel, Jr.
*Assistant Examiner*—Scott T. Baderman
*Attorney, Agent, or Firm*—Whitham, Curtis & Whitham; Lawrence D. Cutter

[57] ABSTRACT

A mechanism for handling processing errors in a computer system. The mechanism includes a first means for processing a stream of instructions, second means for detecting an error caused by a timing dependant defect and occurring during processing of the instruction by the first means and third means for varying the instruction processing cycle time of the first means in response to the detection of the error by the second means, and for causing the second means to retry at least a portion of the instruction subsequent to the varying. In a preferred embodiment, the mechanism uses the variable frequency oscillator, controlled by recovery code, to increase the system clock cycle time by a specified time (Textend) following what has been determined to be a critical fail and after normal retry has been unsuccessful. The increased cycle time extends the net slack and, thereby, provides tolerance to certain AC (path delay) defects which have developed in any cycle time dependant latch to latch segment. The time (T) is chosen based on maximum cycle time restrictions resulting, for example, from the pipelining of data in system cables.

17 Claims, 6 Drawing Sheets

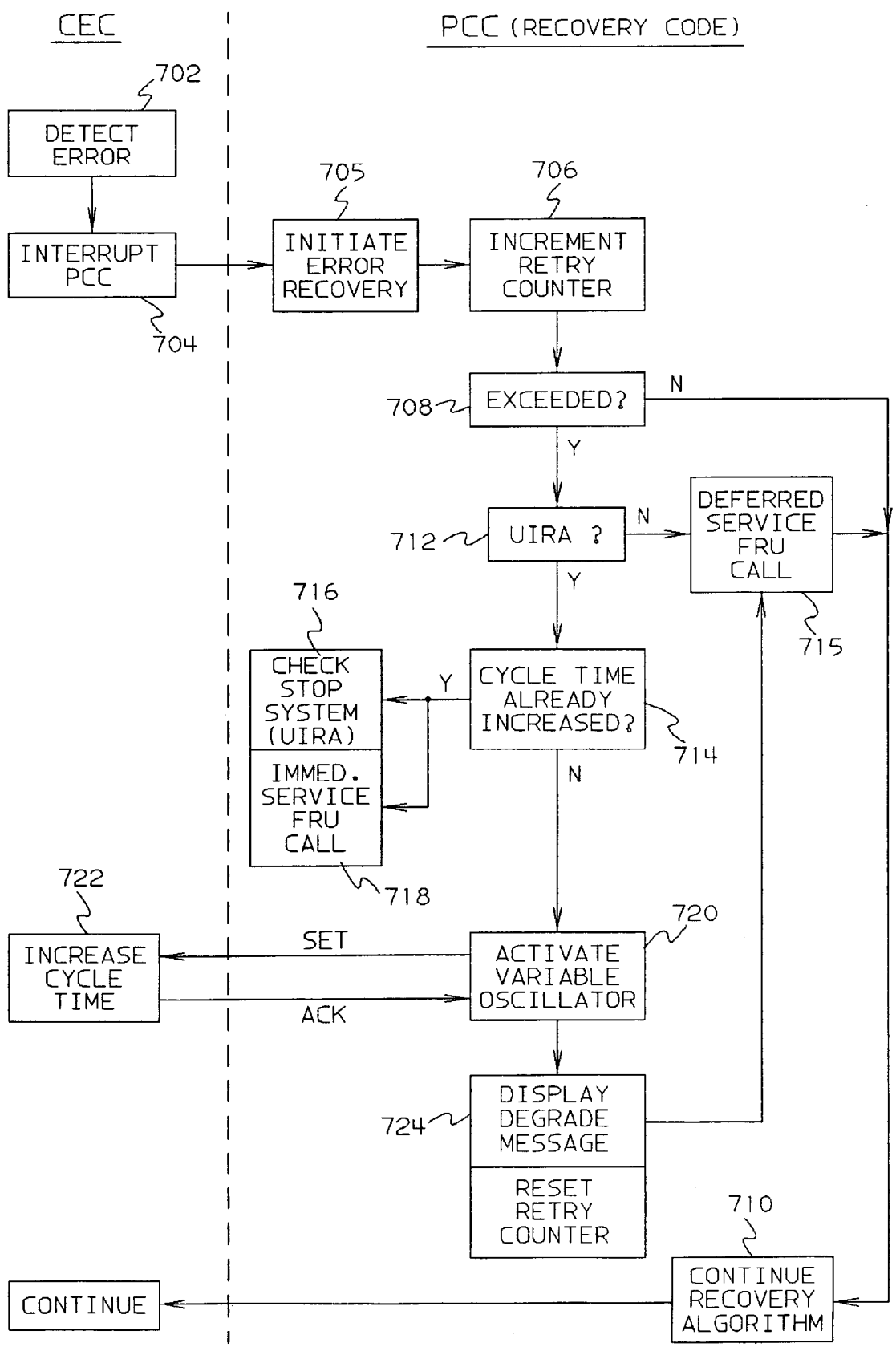

FAULT TOLERANT DESIGN FOR IDENTIFICATION OF AC DEFECTS INCLUDING VARIANCE OF CYCLE TIME TO MAINTAIN SYSTEM OPERATION

This application is a continuation of application Ser. No. 07/807,696, filed Dec. 16, 1991, now abandoned.

I. BACKGROUND OF THE INVENTION

A. Field of the Invention

The present invention relates to error recovery in computer systems. More particularly, the present invention relates to recovery from processing errors caused by AC or timing dependent defects.

B. Related Art

The Unscheduled Incident Repair Action (UIRA) is perhaps the single most important Reliability, Availability and Serviceability (RAS) characteristic. UIRA's are caused by a non-recoverable failure in a critical hardware function which results in the need to bring a customer's system down for repair at an unscheduled time. Circuit failures causing UIRA's can be either AC or DC in nature. DC defects are solid failures which occur whenever a defective circuit is used. AC defects are typically timing dependent and show up only when a timing margin in a logic path is exceeded.

Self-test mechanisms that can distinguish AC defects from DC defects are known in the art. For example, in cases where logic fails a self-test at a first clock speed, it is known in the art to rerun the self-test at a lower clock speed to determine whether the failure was caused by an AC defect or a DC defect. If the self-test passes at the lower clock speed, the failure is identified as having been caused by an AC defect. If the self-test does not pass at the lower clock speed, the failure is identified as being caused by an DC defect. An article entitled "SELF-TEST AC ISOLATION" (IBM Technical Disclosure Bulletin Vol. 28, No. 1, June 1985, pp. 49–51) describes a method to identify the initiating clock pulse of an AC failure, to identify the capturing clock pulse, to identify the capturing storage elements, and to extract the hardware states just prior to and just after the failure for further diagnosis.

While the above test methods provide a means for distinguishing AC defects from DC defects and for fault isolation within a test fixture environment, they do not solve the problem of providing dynamic error recovery or fault tolerance from processing errors caused by AC defects.

Prior art computer systems have been provided with a variety of mechanisms for recovering from processing errors. For example, U.S. Pat. No. 4,912,707 to Kogge et al discloses the use of a checkpoint retry mechanism which enables the retry of instruction sequences for segments of recently executed code, in response to detection of an error since the passage of a current checkpoint. Another example of an instruction retry mechanism is disclosed in U.S. Pat. No. 4,044,337 to Hicks et al.

While such prior art retry mechanisms provide a good means for recovery from soft errors (errors occurring because of electrical noise or other randomly occurring sources which result in non-reproducible fault syndromes), they do not provide recovery from solid or hard errors caused by AC defects (i.e. timing errors which are recurring and consistently reproducible).

Another prior art mechanism for handling processing errors involves the use of redundant processing elements. In such systems, identical instruction streams are processed in parallel by two or more processing elements. When an unrecoverable error is detected in one of the processing elements, it is taken off-line and the other processing element continues to process the instruction stream. One advantage of such redundant processor schemes is that they can handle both "soft" and "solid" or "hard" errors. The disadvantage of such schemes is that providing duplicate processing elements to increase "fault tolerance" significantly increases the cost of the system in terms of parts and manufacture.

Thus, what is needed is an inexpensive mechanism to enable an otherwise conventional computer system to dynamically recover from AC defects.

II. SUMMARY OF THE INVENTION

The present invention comprises a mechanism for handling processing errors caused by AC defects in a computer system. The mechanism includes a first means for processing a stream of instructions, second means for detecting a timing dependent error occurring during processing of the instruction by the first means and third means for varying the instruction processing cycle time of the first means in response to the detection of a timing dependent error by the second means, and for causing the second means to retry at least a portion of the instruction subsequent to the varying.

In a preferred embodiment, the present invention uses a variable frequency oscillator, controlled by recovery code, to increase the system clock cycle time by a specified time (Textend) following what has been determined to be a critical fail and after normal retry has been unsuccessful. The increased cycle time extends the logic path timing slack and, thereby, provides tolerance to certain AC (path delay) defects which have developed in any cycle time dependent latch to latch segment. The time (Textend) is chosen based on maximum cycle time restrictions resulting, for example, from the pipelining of data in system cables.

Successful retry at increased (extended) cycle time means that the defect was time dependant and tolerated by the cycle time extension (Textend). It still results in a service call for deferred repair, but the system can remain up and running. Unsuccessful retry at increased cycle time means that the defect was solid (DC), or AC with a timing characteristic longer than the cycle time extension (Textend). In such instances, an unsuccessful retry results in a UIRA which brings the system down and initiates a service call for immediate repair.

The present invention can be extended to provide data in an error reporting file which can be used to assist manufacturing/repair in defect analysis of the failing hardware. Often, the testing of liquid cooled modules (TCMs) returned from field repair results in a report of "No Defect Found" (NDF). NDFs can be caused by AC defects in TCM to TCM nets which, because of circuit timings, only appear when a failing unit is in place in a customer's machine. Having data in the repair message which identifies that the defect is time dependent and tolerated by the cycle time extension (Textend) can assist in defect isolation and identification.

BRIEF DESCRIPTION OF THE DRAWINGS

FIG. 7 is a flow chart of an AC defect handling method according to an embodiment of the present invention.

DETAILED DESCRIPTION OF THE PREFERRED EMBODIMENT

Figure 1:
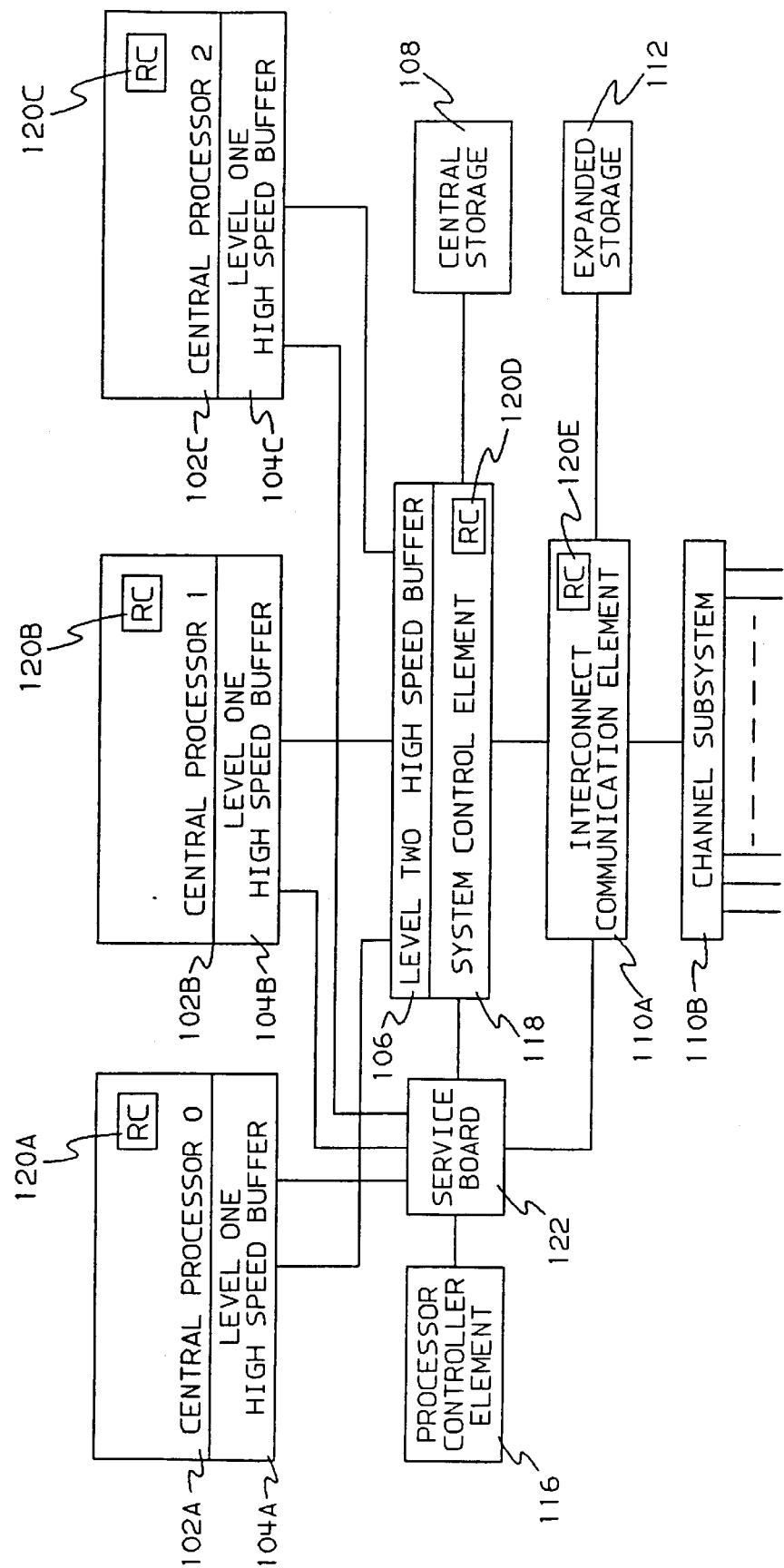
FIG. 1 is a block diagram of a Central Electronics Complex (CEC) in a computer system of a type conforming to IBM ESA/390 Architecture.

Turning first to FIG. 1, a Central Electronics Complex (CEC) in a computer system of a type conforming to IBM Enterprise Systems Architecture/390 (ESA/390) is illustrated. The Central Electronics Complex of FIG. 1 includes three central processors 102A–102C. As is known in the art, multiple CECs can be interconnected to form a computer system having additional central processors. Each central processor (CP) has its own conventional first level high speed buffer (L1) 104A–C. The L1s are connected in turn to a second level high speed buffer (L2) 106 which is shared by all the CPs. The L2 106 is connected to central storage 108, also known as main storage, through a system control element (SCE) 118.

The CEC of FIG. 1 also includes an interconnect communication element (ICE) 110A which controls data transfer and communication between the SCE 118, an expanded storage (ES) 112 and a channel subsystem 110b. The ICE 110a and channel subsystem 110B are also collectively referred to as the I/O Subsystem. System operations and support functions such as powering on and off and configuring the system are controlled by a support processor called the processor controller element (PCE) 116. The PCE 116 includes the system console which is used, for example, to communicate configuration control and error information. The PCE is also used to assist system elements in recovering from errors. Machine-Check error handling, checkpoint synchronization and the general operation of systems conforming to ESA/390 architecture are further described in the document Enterprise Systems Architecture/390 Principles of Operation (document SA22-7201-00 available from International Business Machines Corporation of Armonk, N.Y.) which is incorporated by reference herein.

The Execution of each instruction within the ESA/390 Architecture consists of one or more units of operation. As an instruction executes, the unit or units of operation are completed by the CP. The ESA/390 Architecture permits interrupts to be taken at the points between units of operation (after completion of each unit of operation). An instruction is considered "complete" when its last unit of operation is "complete". When a unit of operation is completed its results are committed to architected facilities such that prior values of those facilities cannot, in general, be restored. This includes loading new values into registers and writing operand store results into storage.

The SCE 106, the ICE 110A and each of the CPs 102-A–C in the system of FIG. 1 includes a recovery control/instruction retry mechanism 120A–120E. A suitable mechanism of this type is described, for example, in copending application Ser. No. 07/751,906, filed Aug. 29, 1991 and assigned to the same assignee as the present invention. Application Ser. No. 07/751,906 is incorporated by reference herein. The operation of this mechanism is such that a failing instruction (or a unit of operation within) is retried until it executes without error or a predetermined retry threshold is reached (whichever occurs first).

As is conventional, the CPs 102(A–C), the SCE 106 and the ICE 110 of FIG. 1 are embodied on circuit boards (TCM boards), each including one or more liquid cooled modules (TCMs) containing electronic components. Each of these elements and the PCE 116 is connected to a service board 122 which provides clocking, data and control signals between the PCE 116 and the CEC.

Figure 2:
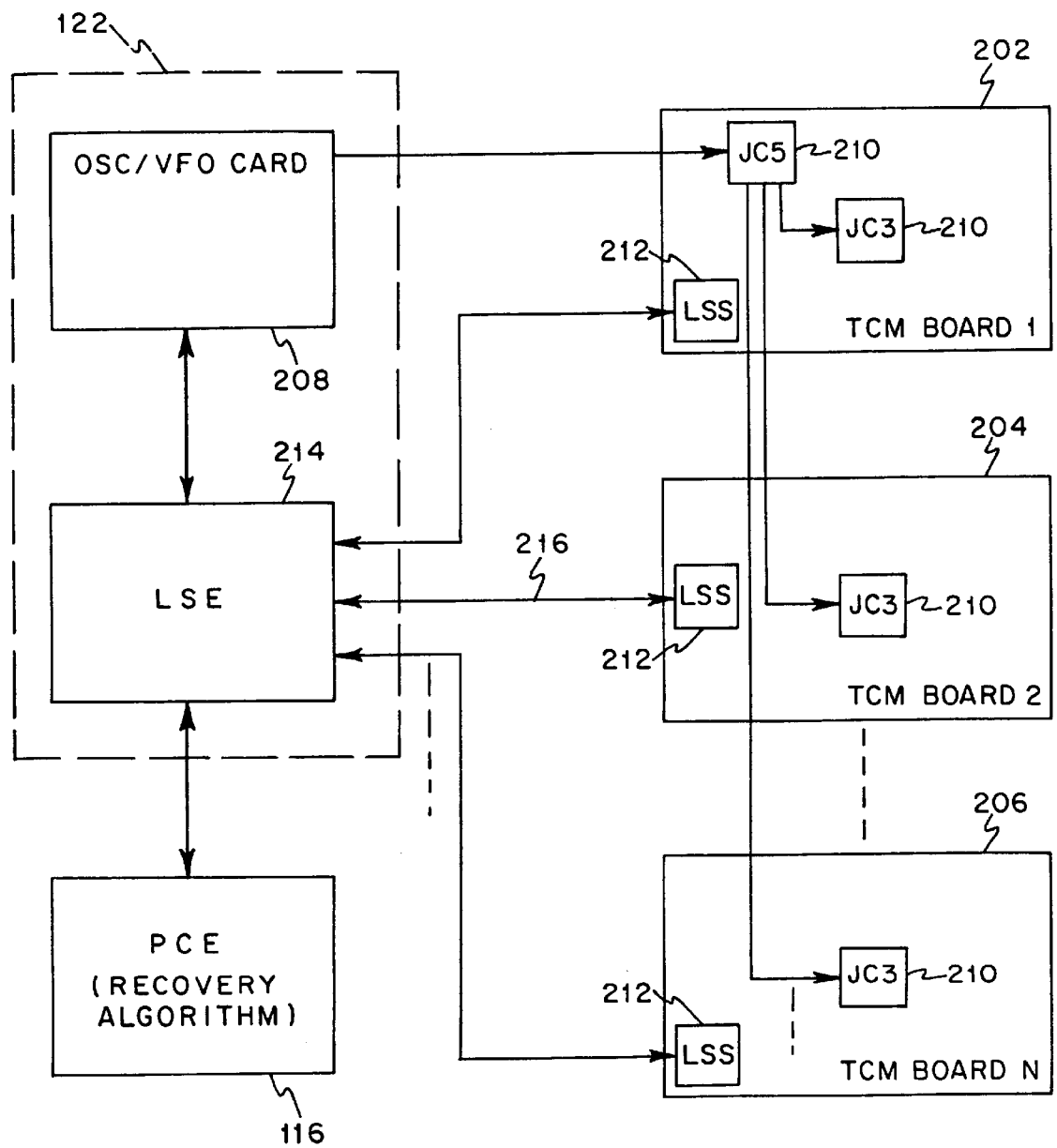
FIG. 2 is a functional block diagram showing TCM boards within the system of FIG. 1 and their interaction with a clock distribution, monitoring and control mechanism according to an embodiment of the present invention.

FIG. 2 is a functional block diagram showing several exemplary TCM boards 202–206 within the system of FIG. 1 and their interaction with a clock distribution, monitoring and control mechanism according to an embodiment of the present invention. The mechanism of FIG. 2 includes a programmable Oscillator/VFO card 208 which generates the system clocks and distributes them to clock distribution chips 210 (JC1–JC5) which are located within the TCMs. The clock distribution chips 210 are interconnected to form a fanout tree, which distributes the clocks to each of the TCMs in the system.

Each of the TCM boards 202–206 also includes a Logic Support Station (LSS) 212 which is located on one of the TCMs on the board. The LSS 212 collects error reporting information from each of the TCMs on the corresponding TCM board. Each LSS is connected to a common Logic Service Element (LSE) 214 (located on the service board) by way of a bidirectional bus 216. The LSE 214 is used to communicate error information from the LSS's 212 to the PCE 116 and to communicate recovery control information from the PCE 116 to the LSS's 212. The PCE 116 uses the LSE 214 to collect the error information from each of the TCM boards including the error type, recovery status information, the LSS/board number and specific TCM on which the error occurred. The PCE 116 uses this information during error recovery and passes error recovery handling information back to the TCMs through the LSE. The LSE also serves as an interface between the PCE 116 and the Oscillator/VFO card 208.

Figure 3:
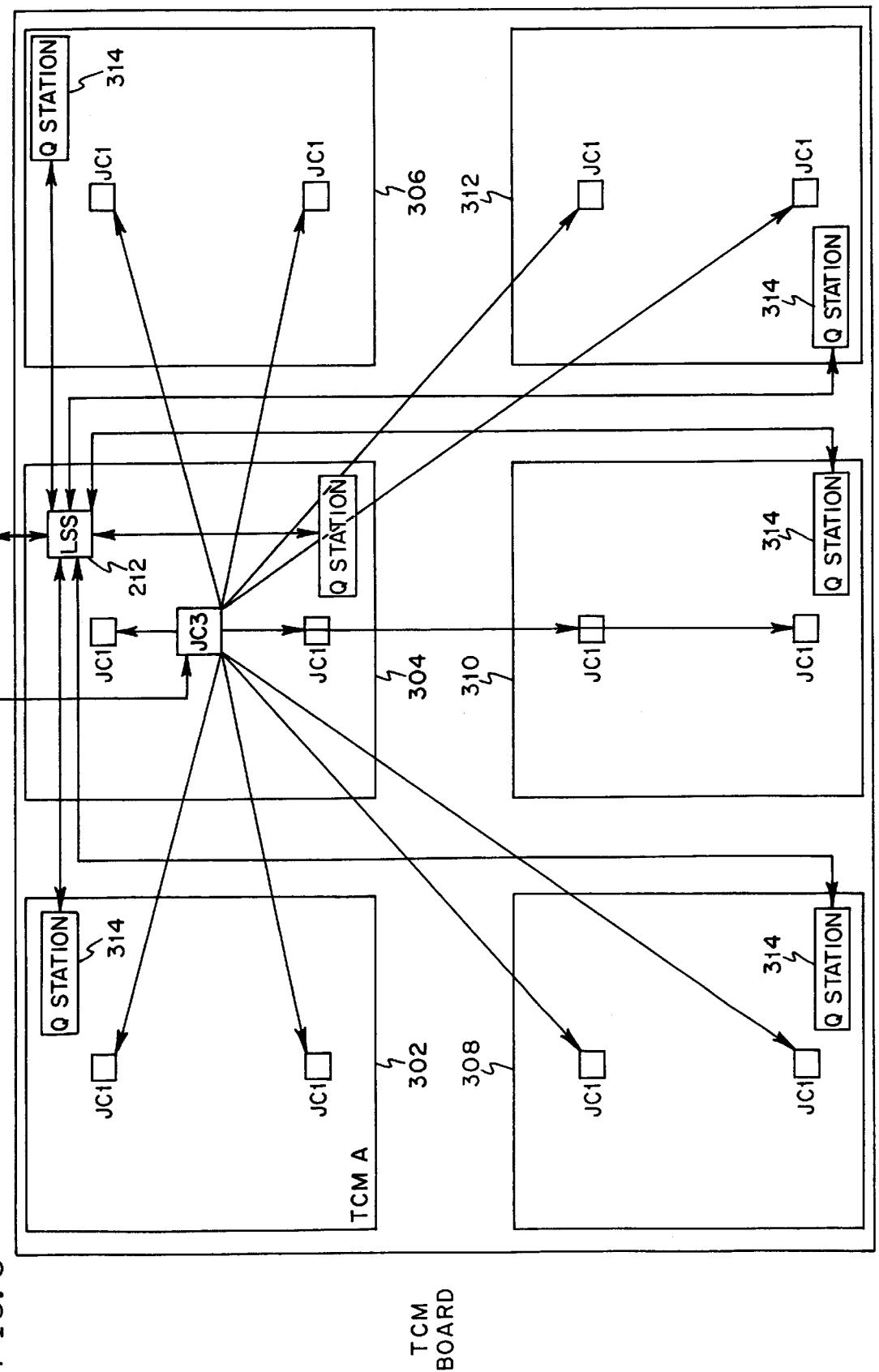
FIG. 3 is a block diagram of a plurality of TCMs on an exemplary TCM board of FIG. 2.

FIG. 3 is an illustration of an exemplary TCM board in the system of FIG. 2. Each TCM board includes a plurality of TCMs 302–312. A clock distribution chip (JC3) on one of the TCMs generates latch and trigger clocks from a single system clock signal distributed by another clock distribution chip (JC5) on TCM BOARD 1 (FIG. 2). Also, one TCM includes the LSS 212 for the TCM board. Each TCM on the TCM board includes its own clock distribution chips and a Q station 314. Each Q station 314 includes error collection hardware for the associated TCM and is connected to the corresponding recovery controls 120(A–E) which maintain operation recovery and retry information. The LSS 212 provides a path for the PCE 116 to collect the error and recovery data from each of the Q stations 314. This information passes from the Q station through the LSS 212 and the LSE 214 to the PCE 116.

Figure 4:
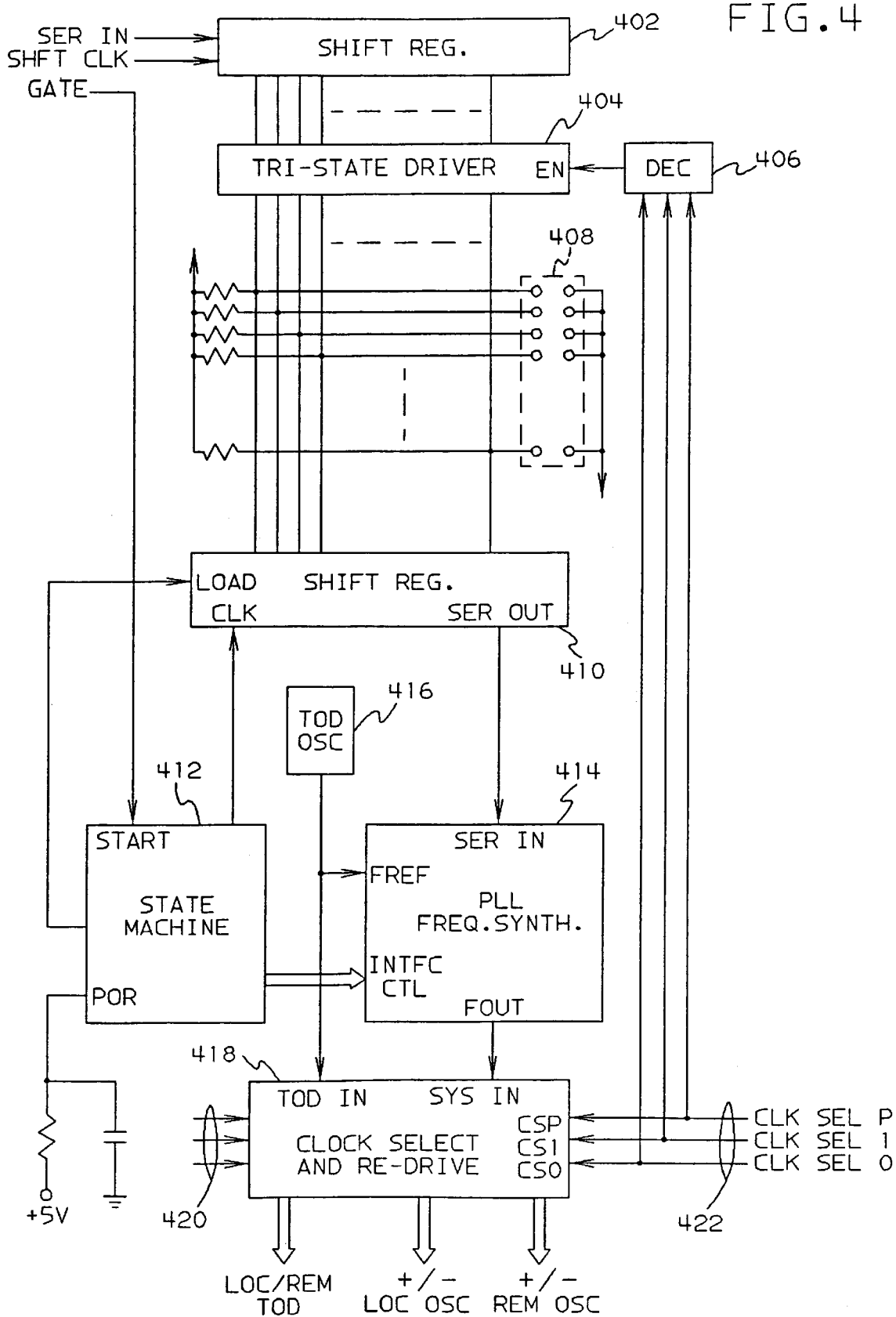
FIG. 4 is a logic diagram of the Oscillator/VFO card of FIG. 2.

FIG. 4 is a logic diagram of the Oscillator/VFO card 208 of FIG. 2. The Oscillator/VFO card 208 includes a first shift register 402 which is connected to receive, in serial, clock frequency control information and a shift clock from the LSE 214. This information is provided to the LSE 214 by way of commands from the PCE 116. The first shift register 402 is, in turn, connected to a tri-state driver 404 which is enabled by way of a signal from a decoder 406. During power up (prior to the time the tri-state driver is enabled) default clock frequency control information is provided by way of program resisters which are received by plug locations 408.

The encoded clock frequency data from the tri-state driver 404 (or the program resisters in the case where the tri-state driver is not enabled, such as during power up) is provided, in parallel, to a second shift register 410. The second shift register 410 is connected to provide the encoded clock frequency control information in serial, under control of clock and load signals provided by a state machine 412, to a phase locked loop (PLL) frequency synthesizer 414. This control information includes two parameters (M and N) which are loaded into internal counters within the frequency synthesizer 414. A 16 MHZ time of day clock oscillator 416 is connected to provide a reference frequency (Fref) for the frequency synthesizer 414. The output frequency of the synthesizer 414 is the product of N/M and Fref (Fout=M/N×Fref). Interface control signals used to program the frequency synthesizer are provided by the state machine 412.

The operation of the state machine 412 is initiated by a control signal from the LSE 214 (which is produced in response to clock programming commands from the PCE 116) or by a power on reset signal generated by the system during power up. The state machine may be embodied as discrete logic, a PLA or a ROM.

The local and remote time of day (TOD) and system clocks are produced by a clock select and redrive circuit 418 in response to the signal produced by the time of day oscillator 416 and the programmable clock signal (Fout) generated by the frequency synthesizer 414. The local clock signals are used to clock the CEC of FIG. 1 while the remote clocks are connected to an interconnected CEC (if one is configured). The local and remote oscillator clocks produced by the clock select and redrive logic are differential signals. The clock-select and redrive module can also be programmed to select one of a plurality of alternate clock inputs 420 (as an alternative to the signal provided by the frequency synthesizer).

Clock select signals 422 from the LSE (also produced in response to commands from the PCE) determine the clock mode of the Oscillator/VFO card. Fout is selected when the Oscillator/VFO card is in fixed frequency mode (where the frequency is determined by the program resistors) or VFO mode. Selecting VFO mode causes the decoder 406 to enable the tri-state driver 404 thereby causing the programmed clock value in the first shift register 402 to override the fixed setting provided by the program resistors.

The aforedescribed clock circuit provides an advantage in the context of the present system and method. When the clock frequency is lowered by Textend it is beneficial to make the transition smoothly (without any glitches in the duty cycle). The use of a phase locked loop frequency synthesizer 414 in the present clock circuit ensures a smooth transition and enables the clock frequency to be changed without the change causing processing errors in itself.

Figure 5:
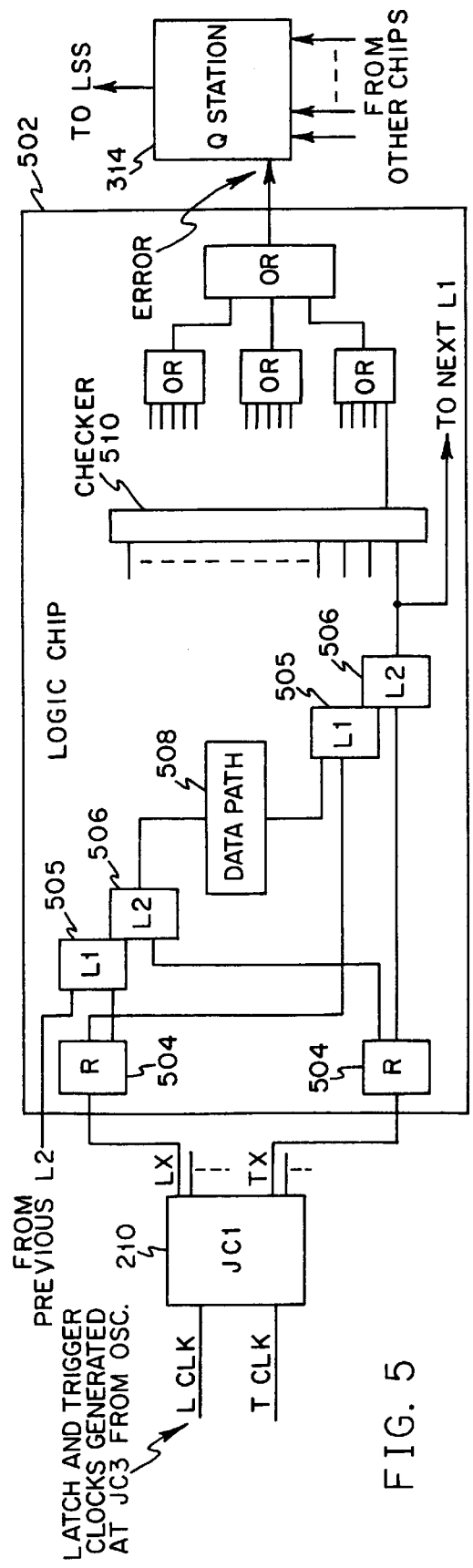
FIG. 5 is a logic diagram of an exemplary logic chip within a TCM of FIG. 3.

The operation of the present invention will now be explained by reference to FIGS. 5 through 7. FIG. 5 is a logic diagram of an exemplary logic chip 502 within a TCM of FIG. 3. The logic chip 502 includes a plurality of receivers 504 which buffer the clock signals received from a clock distribution chip (JC1). The clock distribution chip (JC1) distributes two clocks, L clock (Lx) and T clock (Tx). The trailing edge of the Lx clock causes a first set of latches 504 (L1) to capture the data provided from the output of a previous chip or logic stage. The leading (or launch) edge of the Tx clock, causes a second set of latches 506 (L2) to capture the data held within the first set of latches.

The data within the second set of latches (L2) 506 passes through combinatorial logic (data path 508). The sum of the inherent delays in the data path 508 must allow the data to propagate through those delays in time to be captured in the second set of latches. In other words the data must be available for capture by the trailing edge of the L clock of the next clock cycle.

After the data is captured and stable in the second set of latches, it is checked for errors by error checking circuity 510. The error checking circuitry can be of any of a number of types (such as parity check or compare data) as appropriate for a given logic function. The detection of an error by the error checking circuity on any chip within a TCM is reported to the Q station 314, which, in turn, reports the error occurrence to the LSS 212 for the TCM board on which the chip resides.

Figure 6:
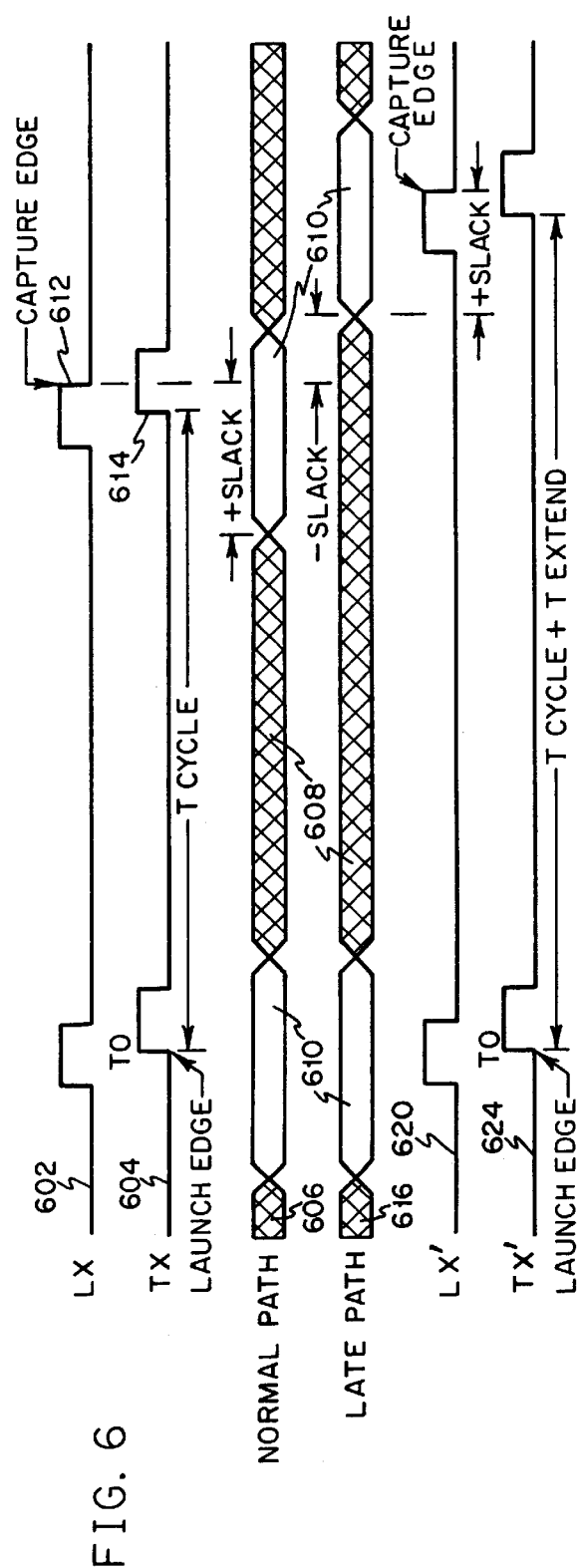
FIG. 6 is a timing diagram showing how varying timing slack according to the present invention can be used to overcome an AC defect.

FIG. 6 is a timing diagram showing how varying timing slack according to the present invention can be used to overcome an AC (timing dependent) defect. The Lx and Tx timing lines 602, 604 represent the L clock and T clock, respectively at a normal operating cycle, for example 9 ns. The data states during normal operation of the system (wherein the logic path does not have an AC defect) is illustrated by the timing line labeled "Normal Path" 606. The cross hatched areas 608 represent times where the data at the L1 latch inputs may be unstable or invalid while clear areas 610 represent times where the data at the L1 latch inputs is stable and valid. During normal operation, the data is stable by the time the falling edge 612 of the Lx clock occurs. Thus, on the occurrence of the falling (capture) edge 612 of the Lx clock data is captured in the L1 latches. After the rising (launch) edge 614 of the Tx clock, data from the L1 latches is transferred to the L2 latches.

After the rising edge of the Tx clock 604 and while the Lx clock 602 is high, the data transfers directly through the L1 latch 504 and the L2 latch 506. Data can become valid at the input of the L1 latches after the launch edge of Tx as long as it meets the set up time before the capture edge of Lx. Data that becomes valid after the rising edge of Tx but before the falling edge of Lx (minus set up time) "steals" from the next cycle since it was not available to launch into the next data path at the time that Tx went high. This does not create any problems for the system when the succeeding data path is short. The amount of time that data is stable and valid at L1 before the capture edge (minus set up time) is referred to as positive L1 slack. Data that becomes valid after the capture edge (minus set up time) exhibits negative L1 slack and may not get captured. This is illustrated by the late path 616 where data is still unstable (cross hatched) at the capture edge. If data were captured here, erroneous data would get launched into the next path and cause an error at a checker 510.

In response to the reporting of the error by the Q-station (relayed to the PCE through the LSS and LSE), the system will take a recovery action. In most instances this means backing up to the last checkpoint and retrying the instruction or operation until it executes without error or until a retry threshold is reached (whichever comes first).

According to an embodiment of the present invention, once the retry threshold is reached (as detected by the PCE), the PCE 116 sends commands to the LSE that, in turn, cause it to reprogram the Oscillator/VFO card 708 to run the system clock at a slower speed. For Example, a normal cycle time of 9 nanoseconds (ns) would be increased by 300 picoseconds (ps). Timing lines 620, 624 show the effect of increasing the cycle time on late path data 616 symptomatic of logic having an AC defect. Lx' and Tx' represent the Lx and Tx clocks running at the increased cycle time.

By slowing the cycle time by the amount Textend, the capture and launch edges are moved to the right as shown on the timing lines for Lx' 620 and Tx' 624. This positions them such that the data again has positive L1 slack as seen by the clear region of the late path 616 in relation to the capture edge of Lx'. The data can now be safely captured and launched onto the next data path.

Even if the data became valid in the transparent region (where Tx' and Lx' are both HIGH) it would be launched as long as it met the set-up time for L1 in relation to Lx'. This would cause cycle stealing, however, and may cause problems on the succeeding data path if it is long. What is desirable to achieve through Textend is to make a late data path look like a normal data path again. This is accomplished by providing enough time for data to become valid before the capture edge and to get launched within a safe period of time after the launch edge to meet the timing restrictions of the next path.

FIG. 7 is a flow chart of an AC defect handling method according to an embodiment of the present invention. In step 702 a TCM within the CEC of FIG. 1 detects an error and, in response, interrupts the processor control code (PCC) in step 704. In response to the interrupt, in step 705 the processor control code (within the PCE 116) initiates an error recovery procedure. During error recovery, the system will typically attempt to recover by retrying the instruction or operation during which the error occurred. As part of the error recovery procedure, in step 706 the PCE 116 will increment a counter and then, in step 708, check whether a retry threshold has been exceeded. If not, in step 710 the PCC code continues the recovery algorithm which can include, for example, restoring the state of the TCM at a most recent checkpoint and then retrying the operation or instruction. If the retry is successful, processing continues in the conventional manner. If the retry is not successful an error is again detected in step 702 and the retry counter is incremented.

Turning again to step 708, if the threshold has been exceeded, in step 712 the PCC code determines whether the failure is such that would normally require a UIRA. If not, in step 715, status is set in the PCE that will cause a deferred service call to be made when the recovery algorithm is complete. A deferred service call indicates that the machine is still operational but needs to be repaired at the customer's convenience. The user can set the PCE such that, at the end of the recovery algorithm, the system will call the service engineer over the telephone or other communication line and report the PCE error message and the information identifying a failing field replaceable unit (FRU) (based on error status collected at the LSE), while at the same time storing all of this data onto a nonvolatile media such as a magnetic disk.

If, in step 712, the PCC code determines that the error is of a type that would result in a UIRA, a test is made in step 714 to determine whether the system clock cycle time has already been increased. If yes, in step 716, the PCC code performs a system check stop, stores the pertinent error recovery and reporting data and displays a UIRA message at the console. Also, in step 718, the system overrides the deferred service call (if not already made) and sends an immediate service call, which can be communicated to the service engineer in the same manner as the deferred service call. An immediate service call indicates that the machine is no longer operational and needs to be repaired before the customer can resume use.

If, in step 714, it is determined that the clock cycle time has not already been increased, in step 720 the PCE extends the clock cycle time via the LSE. In step 722, the PCE sends the appropriate command and control information through the LSE to the oscillator/VFO card (which in turn increases the system clock cycle time) and sends an acknowledge signal back to the PCE. After the LSE has acknowledged the clock cycle change commands from the PCE, in step 724 the PCE displays a message on the system console that indicates that the system is being run in a degraded mode (at slower clock speed). At this time, the retry counter is also reset to zero. Next, in step 715, a deferred service call status is set and the system prepares to send the error status and the console messages to the service engineer by way of an automatic communication. In step 710 the recovery algorithm continues and retries are performed at the new clock speed until either the threshold has been reached or the operation or instruction executes without error.

If the error recovery routine successfully completes the operation without error, the deferred service call is made. If the error recovery routine is not successful, the retry counter is incremented and the operation or instruction is retried. If the retry threshold is reached and a UIRA condition still exists, the system is checkstopped and an immediate service call is made.

It should be understood that, as an alternative to adding a single Textend, the reduction in clock speed can be achieved in increments. In other words Textends (e.g. in smaller increments) can be added cumulatively and iteratively, and the operation retried for each additional Textend until either the operation is executed successfully or the retry threshold is reached. In such a system, the allowable number of additional Textends to attempt can be controlled by comparing a customer selected threshold against the number of iterations attempted by the system. In any event, the clock speed at which retry was successful or the lowest clock speed attempted would be stored by the system and reported to the customer service engineer.

The effect of a power-on reset on the system clock frequency can also be handled in a number of different ways. For example, a power on reset could cause the system to return the original clock frequency on the theory that the purpose for powering down the system was to replace the defective field replaceable unit (FRU). Even in cases where such an assumption was incorrect, the system will eventually detect an error and again reprogram itself to a clock frequency at which the error does not occur. As an alternative, the PCE could store the altered clock frequency in nonvolatile memory and then program the Oscillator/VFO card to this altered frequency at every power up, until it has been given an indication by either an operator or an automatic signaling mechanism that the defective FRU has been replaced.

While the present system has thus far been described in an embodiment wherein each of the CPs is connected to a common clock it will be understood that the invention is also applicable to systems wherein multiple CPs can run asynchronously and are each provided with an independent clocking mechanism. In such an embodiment, the clock circuity of each CP would be coupled to that CPs instruction retry mechanism. If the retry threshold within a given CP was exceeded, the clock for that individual CP would have its cycle time increased and the remaining CPs would continue to operate at full speed. In such a case, the error reporting message in the deferred service call would also identify the specific CP or CPs that are being run at reduced speed.

The present invention also has applications in the engineering test environment. During a clock margin or system cycle time characterization procedure, the system cycle time is shortened until a failure is forced. This failure often results in a system checkstop causing the need to re-IPL (initial program load) and reinitiate the test program module. The restart operation is time consuming and is typically repeated many times during the frequency characterization process. By using the automatic cycle time variation mechanism of the present invention, the clock cycle time is automatically increased after a failure is detected and a message so indicating appears on the screen. Thus, a test engineer can perform clock margin or cycle time characterization tests to system failure without causing a system checkstop or the need to re-IPL.

While the invention has been described with reference to the preferred embodiments, various modifications and changes will become apparent to those of skill in the art which may be made without departing from the true spirit and scope of the invention as defined by the appended claims.

Having thus described our invention, what we claim as new and desire to secure Letters Patent is:

1. A computer system having a mechanism for handling processing errors, comprising:
    first means for detecting an error occurring during processing of an instruction by said computer system;
    second means, coupled to said first means, for causing said computer system to retry at least one operation subsumed by said instruction, in response to detection of said error;
    third means, coupled to said second means, for determining whether said retry was successful; and,
    fourth means, coupled to said second means and said third means for, in response to an indication by said third means that said retry was not successful, varying an instruction processing cycle time of said computer system and for causing said second means to again retry said at least one operation subsequent to said varying, said fourth means including means for continuing operation of said computer system, responsive to said fourth means, and processing the instructions in a fault tolerant manner during the handling of the processing errors; and
    fifth means, coupled to said fourth means, for initiating a deferred service call over a communications link in response to said varying, said deferred service call indicating that digital computer system is operating in a degraded performance mode.

2. The system of claim 1 further comprising: error reporting means coupled to said computer system for collecting error information from components of said computer system and for identifying a specific failing component.

3. The system of claim 2 further comprising: storage means, for storing data indicative that an AC defect has occurred and said error information, on a nonvolatile media in response to said varying.

4. A mechanism for handling processing errors in a computer system having means for processing a stream of instructions, comprising:
    first means, coupled to said means for processing, for detecting an error caused by a timing dependent defect occurring during said processing of said instructions; and,
    second means, coupled to said first means, for retrying an operation resulting in said error and varying an instruction processing cycle time of said means for processing after an unsuccessful retry and for causing said first means to again retry, subsequent to said varying, at least one operation in progress in said computer system when said error was detected, said second means including means for continuing operation of said computer system, responsive to said second means, and processing the stream of instructions in a fault tolerant manner during the handling of the processing errors,
    wherein said second means comprises means for iteratively increasing said instruction processing cycle time until the first of said at least one operation successfully completes or a retry threshold is exceeded.

5. The mechanism of claim 4 further comprising: link means for, subsequent to said varying, initiating a deferred service call over a communications link, said deferred service call indicating that digital computer system is operating in a degraded performance mode.

6. The mechanism of claim 5 further comprising: error collection means, coupled to said first means, for collecting error information from components of said computer system and storing said error information along with data identifying a specific failing component.

7. The mechanism of claim 6 further comprising: storage means, coupled to said error collection means, for storing data indicative that an AC defect has occurred and said error information, on a nonvolatile media in response to said varying.

8. A mechanism for handling processing errors in a computer system having means for processing a stream of instructions, comprising:
    first means, coupled to said means for processing, for detecting an error occurring during said processing of said instructions; and,
    second means, coupled to said first means, for retrying an operation resulting in said error and varying an instruction processing cycle time of said means for processing after an unsuccessful retry and for causing said first means to again retry, subsequent to said varying, at least one operation in progress in said computer system when said error was detected, wherein said second means comprises means for iteratively increasing said instruction processing cycle time until the first of said at least one operation successfully completes or a retry threshold is exceeded.

9. A method for dynamically handling processing errors in a computer system having a plurality of functional units, comprising the steps of:
    detecting an error occurring during processing of an operation by a functional unit;
    determining that said error was caused by a timing dependent defect; and,
    after said determining step, causing said functional unit to process subsequent operations in a degraded performance mode such that said error will not recur, said causing step further continuing operation of said computer system in response to said causing step and processing the subsequent operations in a fault tolerant manner during the handling of the processing errors,
    wherein each of said functional units are processors and wherein said causing said functional unit to process subsequent operations in a degraded mode comprises the step of operating said functional unit at a reduced clock speed while continuing to operate remaining functional units in said plurality of functional units at a normal clock speed.

10. The method of claim 9 wherein each of said functional units are processors, wherein said degraded performance mode comprises processing instructions at a reduced clock speed.

11. The method of claim 9 comprising the further step of continuing processing of operations by a remainder of functional units in said computer system at a same performance level as existed prior to said detecting of said error.

12. A method for handling processing errors in a computer system, comprising the steps of:

processing a stream of instructions;

detecting an error caused by a timing dependent defect occurring during said processing of at least one of said instructions;

in response to detection of said error, causing said computer system to retry at least one operation included within by said at least one of said instructions;

determining whether said retry was successful;

when it is determined that said retry was not successful, varying said instruction processing cycle time of said computer system and again retrying said at least one operation;

in response to said varying, providing continuing operation of said computer system in a fault tolerant manner thereby continuing to process said stream of instructions during the handling of the processing error; and subsequent to said varying, initiating a deferred service call over a communications link, said deferred service call indicating that the computer system is operating in a degraded performance mode.

13. The method of claim 12 comprising the further step of: in response to detection of said error, collecting error information from components of said computer system and storing said error information along with data identifying a specific failing component.

14. The method of claim 13 comprising the further step of: storing data indicative that an AC defect has occurred and said error information, on a nonvolatile media in response to said varying.

15. The method of claim 14 comprising the further step of: initiating a deferred service call over a communications link, said deferred service call indicating that said digital computer system is operating in a degraded performance mode and identifying said failing component.

16. The method of claim 15 comprising the further step of storing information indicative of said instruction processing cycle time, as varied, in a nonvolatile memory, and restoring said system to said instruction processing cycle time, as varied, in response to a power-on reset of said computer system.

17. A method for handling processing errors in a computer system, comprising the steps of:

processing a stream of instructions;

detecting an error caused by a timing dependent defect occurring during said processing of at least one of said instructions;

in response to detection of said error, causing said computer system to retry at least one operation included within by said at least one of said instructions;

determining whether said retry was successful;

when it is determined that said retry was not successful, varying said instruction processing cycle time of said computer system and again retrying said at least one operation; and subsequent to said varying, initiating a deferred service call over a communications link, said deferred service call indicating that digital computer system is operating in a degraded performance mode.

* * * * *